US010678956B2

(12) United States Patent
Puthillathe et al.

(10) Patent No.: US 10,678,956 B2
(45) Date of Patent: Jun. 9, 2020

(54) KEYBOARD FOR PROVISIONING SECURITY CREDENTIALS

(71) Applicant: DELL PRODUCTS, L.P., Round Rock, TX (US)

(72) Inventors: Chandrasekhar Puthillathe, Bangalore (IN); Pravin Janakiram, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 165 days.

(21) Appl. No.: 16/017,036

(22) Filed: Jun. 25, 2018

(65) Prior Publication Data

US 2019/0392181 A1 Dec. 26, 2019

(51) Int. Cl.
| G06F 21/00 | (2013.01) |
| G06F 3/02 | (2006.01) |
| H04L 9/32 | (2006.01) |
| G06F 21/83 | (2013.01) |
| G06F 21/44 | (2013.01) |
| G06F 21/57 | (2013.01) |

(52) U.S. Cl.
CPC ............. G06F 21/83 (2013.01); G06F 21/44 (2013.01); G06F 21/57 (2013.01)

(58) Field of Classification Search
CPC ................................. G06F 21/83; G06F 21/44
USPC .......................................................... 726/16
See application file for complete search history.

(56) References Cited

U.S. PATENT DOCUMENTS

| 8,972,272 | B1* | 3/2015 | Dvorak | G16H 40/63 |
| | | | | 705/3 |
| 8,995,670 | B2* | 3/2015 | Lambert | G10L 25/48 |
| | | | | 381/56 |
| 2009/0025089 | A1* | 1/2009 | Martin | G06F 21/31 |
| | | | | 726/28 |
| 2010/0030578 | A1* | 2/2010 | Siddique | G06Q 10/0637 |
| | | | | 705/3 |
| 2011/0307503 | A1* | 12/2011 | Dlugosch | G06K 9/00973 |
| | | | | 707/758 |
| 2012/0254761 | A1* | 10/2012 | DeWitt | G06F 3/048 |
| | | | | 715/733 |
| 2013/0215116 | A1* | 8/2013 | Siddique | G06Q 30/0643 |
| | | | | 345/420 |

(Continued)

Primary Examiner — Haresh N Patel
(74) Attorney, Agent, or Firm — Isidore PLLC (57) ABSTRACT

A method and data processing device for detecting connection of a second device at an interface of an IHS. The method includes receiving a request to modify at least one secure functionality associated with the IHS, the request comprising identification input. The method includes generating security credentials that correspond to a predetermined level of security that is assigned to the identification input. The method includes triggering the service processor to establish a secure communication link to the second device for communicatively connecting a digitally generated keyboard. The method includes autonomously inputting the security credentials to the digitally generated keyboard. The method includes signaling to the digitally generated keyboard to write the security credentials to the second device for use to obtain access to the IHS according to the predetermined level of security. Based on the predetermined level of security, the method includes enabling management of certain functionalities of the IHS.

20 Claims, 7 Drawing Sheets

(56) References Cited

U.S. PATENT DOCUMENTS

| | | | |
|---|---|---|---|
| 2014/0240234 A1* | 8/2014 | Bylander | G06F 3/04895 |
| | | | 345/168 |
| 2014/0279543 A1* | 9/2014 | Ruhrig | G06Q 50/01 |
| | | | 705/44 |
| 2014/0373133 A1* | 12/2014 | Foresti | G06F 21/31 |
| | | | 726/19 |
| 2015/0205946 A1* | 7/2015 | Aurongzeb | G06F 21/36 |
| | | | 726/19 |
| 2015/0371032 A1* | 12/2015 | Puli | G06F 21/36 |
| | | | 726/7 |
| 2016/0210602 A1* | 7/2016 | Siddique | G06Q 20/0453 |
| 2016/0344773 A1* | 11/2016 | Knjazihhin | G06F 16/148 |
| 2016/0364243 A1 | 12/2016 | Puthillathe et al. | |
| 2017/0017450 A1* | 1/2017 | Bostick | G09G 5/12 |
| 2017/0364234 A1* | 12/2017 | Ligameri | G06F 3/0489 |
| 2017/0364258 A1* | 12/2017 | Ligameri | G06F 3/04886 |
| 2017/0371811 A1* | 12/2017 | Noyes | G06F 13/28 |
| 2018/0024841 A1* | 1/2018 | Hiscock | G06F 13/4282 |
| | | | 713/100 |
| 2018/0046944 A1* | 2/2018 | Barbera | G06F 3/0482 |
| 2018/0089019 A1* | 3/2018 | Noyes | G06F 11/1076 |
| 2018/0089113 A1* | 3/2018 | Bell | G06F 13/126 |
| 2018/0113825 A1* | 4/2018 | Huggins | G06F 13/28 |
| 2018/0113951 A1* | 4/2018 | Tanner | G06F 16/248 |
| 2018/0114131 A1* | 4/2018 | Grimm | G06N 5/003 |
| 2018/0137837 A1* | 5/2018 | Peana | G09G 5/10 |
| 2018/0359259 A1* | 12/2018 | Leon | H04L 63/102 |
| 2019/0114075 A1* | 4/2019 | Jung | G06F 3/0346 |
| 2019/0392181 A1* | 12/2019 | Puthillathe | G06F 21/57 |

\* cited by examiner

KEYBOARD FOR PROVISIONING SECURITY CREDENTIALS

BACKGROUND

1. Technical Field

The present disclosure relates in general to service processors of an information handling system (IHS), and more particularly to a method and system for provisioning security credentials to access a secure service processor.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS can include a service processor for monitoring the physical state of the IHS. The service processor autonomously monitors and manages operations of the HIS, independent of the host system's CPU, firmware, and operating system. The service processor, along with a computer interface, such as the Intelligent Platform Management Interface (IPMI), provides a way to manage a computer that may be powered off or otherwise unresponsive by utilizing a network connection to the hardware rather than a communicative connection to the operating system or login platform. Customers who utilize a service processor configuration have complete control of the operating system, the IPMI, and the service processor. Often, such customers prefer not to share service processor credentials with service providers. However, service providers are responsible for hardware serviceability, such as part replacement. In one example, a customer, such as a financial institution, becomes vulnerable to malicious attacks when service processor credentials are disclosed. In situations in which parts need to be replaced, service providers are able to replace the parts, but cannot restore and/or upgrade hardware and firmware configuration settings. Replacing and/or changing hardware parts without providing corresponding upgrades to the IHS system can cause the IHS to operate less than optimally. Further, operating new hardware using older software and/or firmware settings can cause wear on the hardware, eventually leading to early deterioration of the circuitry associated with the hardware.

BRIEF SUMMARY

Disclosed are a method and an information handling system for generating a digital keyboard to autonomously provision security credentials to a second device. The security credentials enable access to manage secure functionalities of an information handling system (IHS).

According to illustrative embodiments of the present disclosure, a method includes managing security credentials associated with a service processor of an IHS. The method also includes detecting a connection of a second device at an input/output interface of the IHS. The method includes receiving a request to modify at least one secure functionality associated with the IHS. The received request includes an identification input. In response to receiving the identification input, the method includes generating, by the service processor, security credentials that correspond to a predetermined level of security that is assigned to the identification input. The method includes triggering the service processor to establish a secure communication link to the second device. The secure communication link is provided to communicatively connect a digitally generated keyboard. The digitally generated keyboard enables unidirectional input by the service processor. The method also includes autonomously inputting the security credentials to the digitally generated keyboard. The method includes signaling to the digitally generated keyboard to write the security credentials to an open text editor of the second device. The security credentials can be utilized to obtain access to the IHS according to the predetermined level of security. Based on the predetermined level of security, the method includes enabling management of certain functionalities of the IHS by the second device.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Disclosed are a method and an information handling system for generating a digital keyboard to autonomously provision security credentials to a second device. The security credentials enable access to manage secure functionalities of an information handling system (IHS). In accordance with embodiments of the present disclosure, an IHS includes a processor, a service processor, and a memory system. The service processor is communicatively coupled to the processor. The memory system is communicatively coupled to the processor and the service processor. A secure digital keyboard (SDK) utility is stored on the memory system. The SDK utility executes on the service processor to enable the service processor to detect a connection of a second device at an input/output interface of the IHS. The service processor receives a request to modify at least one secure functionality associated with the IHS. The request includes an identification input. In response to receiving the identification input, the SDK utility executes on the service processor to generate security credentials that correspond to a predetermined level of security that is assigned to the identification input. Further the SDK utility triggers the service processor to establish a secure unidirectional communication link to the second device in order to communicatively connect a digitally generated keyboard. The digitally generated keyboard receives unidirectional input from the service processor. The service processor autonomously inputs the security credentials to the digitally generated keyboard. The service processor signals to the digitally generated keyboard to write the security credentials to an open text editor of the second device for use to unlock access to the IHS according to the predetermined level of security. Based on the predetermined level of security, the service processor enables management of certain functionalities of the IHS by the second device.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
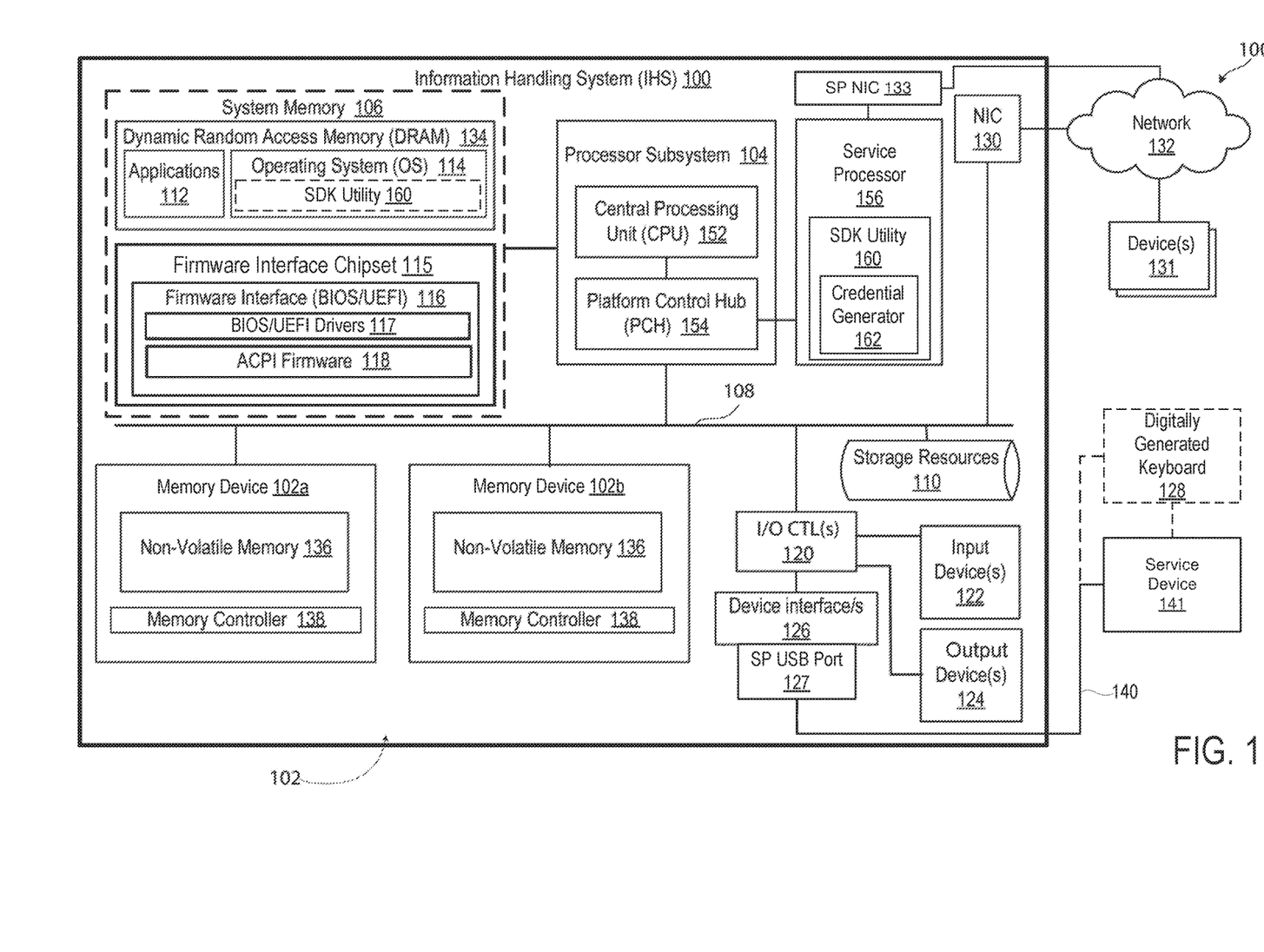
FIG. 1 illustrates a block diagram representation of an example information handling system that supports generating a digital keyboard for provisioning security credentials, according to one or more embodiments.

FIG. 1 illustrates a block diagram representation of an example IHS 100 that supports managing security credentials associated with a service processor of IHS 100, according to one or more embodiments. Within the general context of IHSs, IHS 100 may include any instrumentality or an aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a personal digital assistant, a consumer electronic device, a network storage device, or any other suitable device and may vary in size, shape, performance, functionality, and price. The IHS may include random access memory (RAM), one or more processing resources such as a central processing unit (CPU) or hardware or software control logic, read-only memory (ROM), and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Referring again to FIG. 1, processor subsystem 104 is coupled to system memory 106 via system interconnect 108. System interconnect 108 can be interchangeably referred to as a system bus, in one or more embodiments. System interconnect 108 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. System interconnect 108 communicatively couples various system components including, for example, system interconnect 108 communicatively couples replaceable local storage resources 110 such as solid-state drives (SSDs) and hard disk drives (HDDs). One or more software and/or firmware modules can be stored within SDDs and HDDs, and one or more sets of data can be utilized during management operations of/for IHS 100. Specifically, in one embodiment, system memory 106 can include therein a plurality of such modules stored in dynamic random-access memory (DRAM) 134. These modules include one or more of application(s) 112 and operating system (OS) 114. Application(s) 112 may include a word processing application, a presentation application, and a management station application, among other applications. The various applications having varying functionality when their corresponding program code is executed by processor subsystem 104 or other processing devices within IHS 100. Further, firmware interface chipset 115 can be coupled to and/or within system memory 106 firmware interface chipset 115. Firmware interface chipset 115 is hardware that includes firmware interface 116 and enables the implementation of firmware interface 116. Firmware interface 116 may be, for example, Basic Input/Output System (BIOS) or Unified Extensible Firmware Interface (UEFI). BIOS is non-volatile firmware used to perform hardware initialization during the booting process (power-on startup), and to provide runtime services for operating systems and programs. UEFI is a specification for a software program that connects a computer's firmware to its operating system (OS). Alternatively, in one embodiment BIOS/BIOS drivers are utilized to provide runtime services to IHS 100. In another embodiment, UEFI is utilized to perform runtime services to the IHS 100. The BIOS and UEFI drivers are represented herein as BIOS/UEFI drivers 117. The corresponding set of drivers are to be utilized with the corresponding firmware interface 116. BIOS or UEFI has instructions for controlling input/output operations associated with IHS 100. Additionally, firmware interface chipset 115 includes Advanced Configuration and Power Interface (ACPI) firmware 118.

IHS 100 also includes one or more memory devices 102a and 102b coupled to a processing subsystem, or "processor" 104. Regions of memory devices 102a and 102b can be configured as persistent memory. Memory devices 102a and 102b may have a shared memory controller or separate memory controller. The memory controller connected to memory devices 102a and 102b is represented here as memory controller 138. Although a same memory controller 138 is shown as a component of memory device 102a and 102b, IHS 100 can include more than one separate memory controller devices. Each of memory device 102a and 102b can include non-volatile memory. For example, memory device 102a includes non-volatile memory 136. IHS 100 can automatically update memory devices 102a and 102b with a locally-accessible copy of a firmware image. Thereby, memory devices 102a and 102b can operate using the same version of firmware image.

IHS 100 further includes one or more input/output (I/O) controllers 121 that support connection by and processing of signals from one or more connected input device/s 122, such as a keyboard, mouse, touch screen, or microphone. I/O controllers 120 also support connection to and forwarding of output signals to one or more connected output devices 124, such as a monitor or display device or audio speaker(s). Additionally, in one or more embodiments, one or more device interfaces 126, such as an optical reader, a Universal Serial Bus (USB), a card reader, Personal Computer Memory Card International Association (PCMCIA) slot, and/or a high-definition multimedia interface (HDMI), can be associated with IHS 100. Device interface(s) 126 can be utilized to enable data to be read from or be stored to corresponding removable storage device/s, such as a compact disk (CD), digital video disk (DVD), flash drive, or flash memory card. In one or more embodiments, device interface(s) 126 can further include general purpose I/O interfaces such as inter-integrated circuit ($I^2C$), system management bus (SMB), and peripheral component interconnect (PCI) buses.

IHS 100 comprises network interface controller (NIC) 130. NIC 130 enables IHS 100 and/or components within IHS 100 to communicate and/or interface with other devices, services, and components that are located external to IHS 100, represented as network devices 131. These devices, services, and components can interface with IHS 100 via an external network, such as example network 132, using one or more communication protocols that include transport control protocol (TCP/IP) and network block device (NBD) protocol. Network 132 can be a local area network, wide area network, personal area network, and the like, and the connection to and/or between network, and IHS 100 can be wired, wireless, or a combination thereof. For purposes of discussion, network 132 is indicated as a single collective component for simplicity. However, it should be appreciated that network 132 can comprise one or more direct connections to other devices as well as a more complex set of interconnections as can exist within a local area network or a wide area network, such as the Internet.

Processor subsystem 104 can include a central processing unit (CPU) 152 that is augmented by a platform control hub (PCH) 154. The PCH 154 interfaces to functional components of the IHS 100 such as service processor 156. Service processor 156 operates as a system management interface that is capable of monitoring the physical state of IHS 100. Service processor 156 is embedded within the main circuit board or motherboard of IHS 100. Service processor 156 helps to monitor additional servers and/or devices remotely connected to IHS 100. Service processor 156 may manage and/or monitor one or more virtual machine(s) associated with IHS 100. Service processor 156 may include a network interface card that is separate from NIC 130, for example service processor (SP) NIC 133. In one embodiment, service processor 156 includes a direct feature that enables a service device, such as service device 141, to connect at a supporting hardware interface. The supporting hardware interface can be a component associated with device interface(s) 126, for example, service processor universal serial bus (SP USB) port 127. SP USB port 127 enables service device 141 to interact directly with interfaces associated specifically with service processor 156. For example, interfaces associated with service processor 156 can include a remote accessibility interface and/or a web services management interface.

Service processor 156 includes secure digital keyboard (SDK) utility 160. SDK utility 160 includes credential generator 162. In one embodiment, SDK utility 160 is a separate software utility that is stored within service processor 156. Service processor selectively executes SDK utility 160 in response to detection of a second device coupled to/at SP USB port 127. Service processor 156 detects connection of service device 141 at SP USB port 127. Service device 141 may be connected via USB cable 140, which includes two connector ends. The connector ends may be a same or different combination of connector ends. For example, USB cable 140 can be configured with a USB type A connector to USB type A connector, USB type A connector to USB type B connector, USB type A to USB mini-B connector, and USB type A connector to USB micro connector cable. In one embodiment, in response to detecting USB cable 140 connected at SP USB port 127 and concurrently detecting certain hardware input, service processor 156 emulates a network device to mimic remote access activities that may be associated with IHS 100. The hardware input can be, for example, input of a key, biometric input, hardware button selection. The hardware button selection can be for a predetermined amount of time to operate as an input trigger, in one embodiment. In one embodiment, service processor 156 is connected to a dedicated network interface card, SP NIC 133. SP NIC 133 enables service processor to connect to network 132 independent of the processor subsystem 104 for maintenance of IHS 100.

In one embodiment, IHS 100 detects USB cable 140 at SP USB port 127, and concurrently detects the certain hardware input. In response to detecting USB cable 140 at SP USB port 127 and the certain hardware input, IHS 100 activates a direct connection to service processor 156. The direct connection to service processor 156 bypasses operations associated with other components, enabling service processor 156 to initiate an active connection to service device 141. The direct, active connection is important when IHS 100 is experiencing hardware and/or software malfunctions, when IHS 100 requires updates, and/or when components of IHS 100 need replacement. Moreover, direct connection to service processor 156 circumvents exposure to confidential information that is stored on IHS 100. Enabling service (of IHS 100) via direct connection to service processor 156, which prevents access to confidential information, is critical for institutions, such as government and/or financial institutions, that handle sensitive data daily.

One functionality provided by SDK utility 160 is that of generating digitally generated keyboard 128. In one embodiment, utilizing USB cable 140, service processor 156 initially enables a unidirectional connection to service device 141. The unidirectional connection prevents malware and/or malicious applications from infiltrating IHS 100, which would be possible via a bidirectional connection over device interface(s) 126. Communicating over USB cable 140, service processor 156 temporarily writes digitally generated keyboard 128 to a storage device of service device 141. Service processor 156 enables digitally generated keyboard 128 to be displayed on a display of service device 141. Service processor 156 generates security credentials utilizing credential generator 162. The security credentials are forwarded to digitally generated keyboard 128 via USB cable 140. As will be discussed herein, the security credentials enable access to manage certain features of IHS 100. Additional aspects of SDK utility 160 and functionalities associated thereof, are presented within the description of FIGS. 2-7, with each figure described with reference to components presented within the preceding figure(s).

Figure 2:
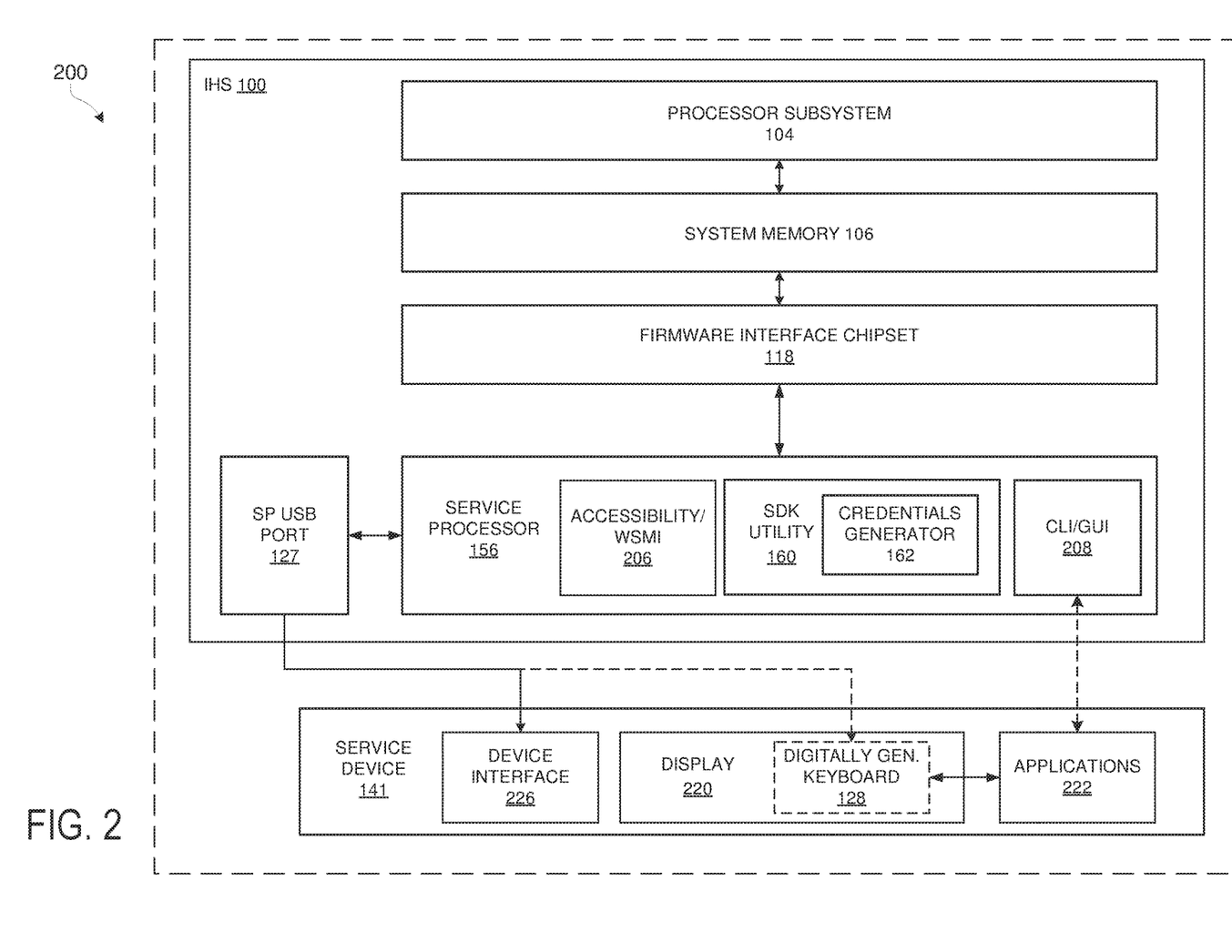
FIG. 2 illustrates example contents of an information handling system and service processor used for generating a digital keyboard and provisioning security credentials, according to one or more embodiments.

FIG. 2 illustrates an example security credential provisioning device layout 200. Security credential provisioning device layout 200 includes example contents of an information handling system (100) and service processor 156 for generating a digital keyboard and provisioning security credentials, according to one or more embodiments. As illustrated, security credential provisioning device layout 200 includes IHS 100 and service device 141.

Within IHS 100, service processor 156 is communicatively connected to processor subsystem 104, system memory 106, firmware interface chipset 118, and SP USB 127. Service processor 156 includes SDK utility 160, and a scriptable interface, such as graphical user interface/command line interface (GUI/CLI) 208 for displaying commands/information from service processor 156. Further, service processor 156 includes remote accessibility interface and/or a web services management interface (WSMI) 206. GUI/CLI 208 enables an operator to input security credentials and/or manage certain functionalities of IHS 100. SDK utility 160 includes credentials generator 162, which generates security credentials for accessing certain functionalities of IHS 100. These functionalities can include, but are not limited to, managing software updates/restoration, firmware updates/restoration, restoration of hardware/firmware configuration settings, restoration/modification of service processor settings, restoration/modification of storage configurations, etc.

Service device 141 includes device interface 226, display 220, and applications 222. Device interface 226 can be, for example, a USB port for receiving a connector of USB cable 140, of FIG. 1. Applications 222 may include a text editor for receiving security credentials for use to access certain functionalities of IHS 100.

In operation, SDK utility 160 executes on service processor 156 to enable the service processor 156 to detect a connection of service device 141 to an input/output interface of IHS 100, such as SP USB port 127. Service device 141 connects to SP USB port 127 via a cable, such as USB cable 140. The direct connection of USB cable 140 to SP USB port 127 triggers service processor to initiate a request to modify certain functionalities of IHS 100. In one embodiment, service processor 156 receives an identification input concurrently with detecting the direct connection to SP USB port 127. The identification input can be a hardware trigger, for example, an input of a key, a biometric input, a hardware button selection, or a combination thereof, that is connected to IHS 100. The identification input helps identify a level of security to implement when generating security credentials for access to IHS 100. For example, in response to a hardware button being engaged for a predetermined amount of time, a user receives a first level of access to IHS 100. In response to a certain biometric input, a user receives a second level of access to IHS 100. In response to a combination of hardware buttons and/or biometric input, the user is provided a third level of access to IHS 100.

Service processor 156 detects the connection and receives the identification input via the connection. Service processor 156 interprets/identifies the connection as a request by service device 141 to modify at least one secure functionality associated with IHS 100. In response to receiving the identification input, credentials generator 162, of SDK utility 160, maps the identification input to a predetermined level of security. SDK utility 160 generates security credentials that correspond to a predetermined level of security that is assigned to the identification input. The generated security credentials can be a global unique identification number (GUID), a user name and password, or a combination of the GUID and the username/password. In one embodiment, credentials generator 162 generates security credentials based on an identified problem that is associated with IHS

100. For example, service processor 156 identifies that the BIOS settings are due for a reconfiguration/updates. Therefore, service processor 156 prompts credentials generator 162 to generate security credentials that enable modification of the BIOS settings.

Initially, SDK utility 160 triggers service processor 156 to establish a secure unidirectional communication link as a secure connection to service device 141. The unidirectional communication link enables writes to be communicated to service device 141 via USB cable 140, while preventing writes from service device 141. Service processor 156 connects digitally generated keyboard 128 to service device 141. Service processor 156 transmits digitally generated keyboard 128 to service device 141 via USB cable 140. A storage device of service device 141 temporarily stores digitally generated keyboard 128. Digitally generated keyboard 128 is graphically output to a display of service device 141 as a human interface device (HID) keyboard. However, instead of digitally generated keyboard 128 receiving human input (or input from the second device), digitally generated keyboard 128 receives unidirectional input from service processor 156. Service processor 156 autonomously inputs the security credentials generated by credentials generator 162 to digitally generated keyboard 128. A write operation inputs the security credentials directly to digitally generated keyboard 128. In response to transmission of the security credentials, service processor 156 signals to digitally generated keyboard 128 to write the security credentials to an open text editor of service device 141. The open text editor of service device 141 receives the security credentials for use by an operator to unlock access to certain functionalities of IHS 100. Service processor 156 disconnects digitally generated keyboard 128. The operator of service device 141 writes the security credentials to CLI/GUI 208 of service processor 156 to gain access to one or more functions of IHS 100. The level of access obtained is based in part on a predetermined level of security associated with the particular security credentials. Based on the predetermined level of security, service processor 156 enables management by service device 141 of certain functionalities of IHS 100.

In one or more embodiments, access to service processor 156 can be denied. For example, in response to the identification input being unrecognizable and/or unauthorized, access to service processor 156 is denied. In another example, in response to service processor 156 recognizing an attempt to override digitally generated keyboard 128, access to service processor 156 is invalidated. As a third example, if the wrong security credentials are input to CLI/GUI 208, access to service processor 156 is invalidated. As a fourth example, in response to service processor 156 identifying malware and/or a malicious application/software on service device 141, access to service processor 156 is invalidated.

To access and/or manage certain functionalities of IHS 100, service device 141 has to receive authorization from service processor 156. Access to IHS 100 and/or functions thereof via service processor 156 is important because functionalities of IHS 100 can be inoperative or operating improperly. Further, direct access to service IHS 100 via service processor 156 minimizes a chance of a security breach of IHS 100. The write operation of the security credentials to digitally generated keyboard 128 is advantageous because service processor 156 does not have to rely on service device 141 having any particular software to receive the security credentials. Further, by inputting the security credentials to digitally generated keyboard 128, service processor 156 is writing to a known device. Additionally, with the present implementation, the security credentials do not have to be verbally transferred and/or physically transferred to the onsite service operator/provider. Also, the owner/manager of IHS 100 is also not required to keep track of yet another password/security credentials to provide to an onsite service operator.

Figure 3A:
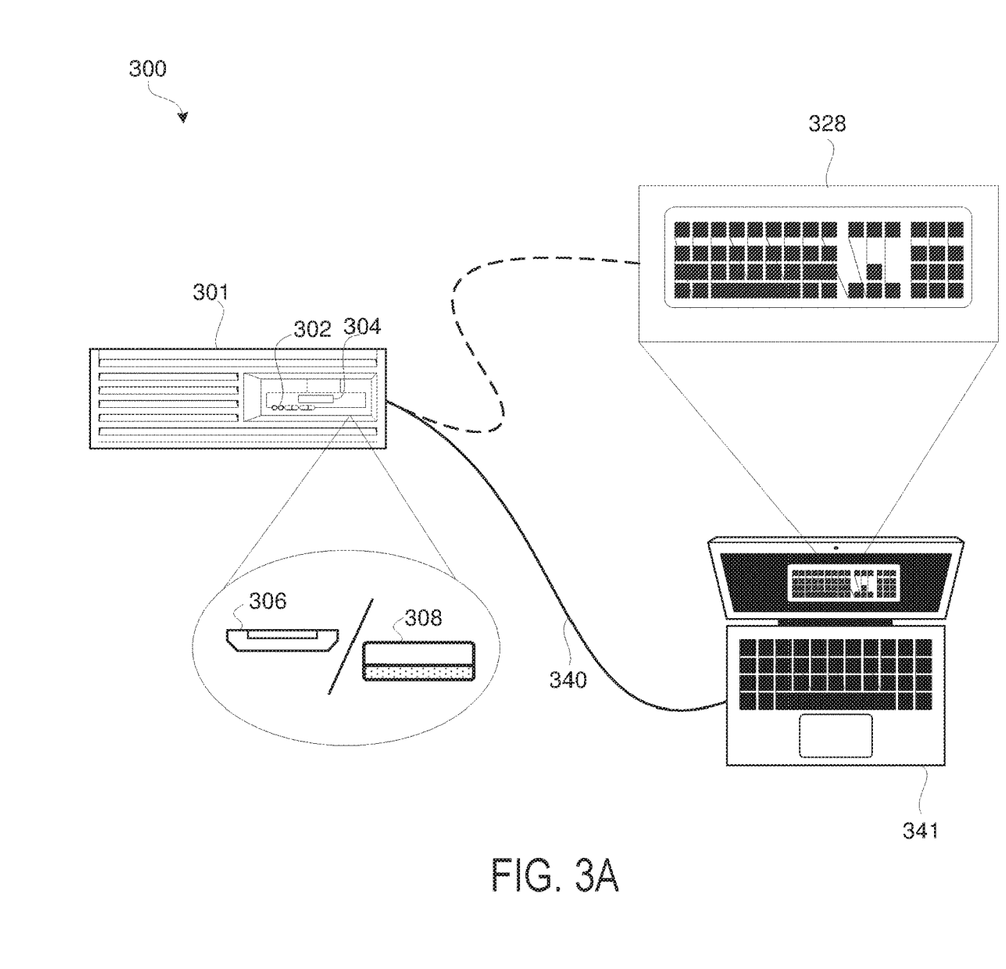
FIG. 3A illustrates an example information handling system with an information screen communicatively coupled to a second device, according to one or more embodiments.
Figure 3B:
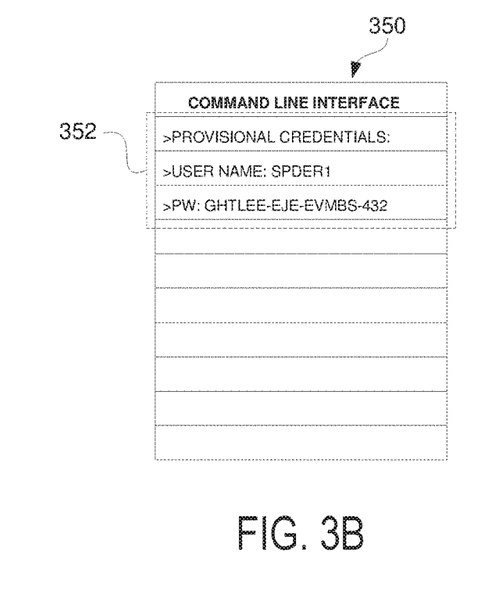
FIG. 3B illustrates an example text editor, according to one or more embodiments.

FIG. 3A illustrates an example IHS service environment 300 having information handling system 301 with an information screen (304) communicatively coupled to a second device (341), according to one or more embodiments. IHS service environment 300 also includes digitally generated keyboard 328. IHS 301 is configured identically to IHS 100. Herein, components associated with IHS 100 will be referenced to as components of IHS 301. IHS 301 includes hardware input 302, information screen 304, and input/output device interfaces, micro USB port 306 and USB port 308. IHS 301 is similar in components and functionality to IHS 100 and connects to service device 341 via USB cable 340. FIG. 3B illustrates text editor 350 for displaying information 352 associated with IHS 100.

Information screen 304 of IHS 301 can output current status of hardware/software, internet protocol (IP) address, and/or media access control (MAC) address associated with IHS 301. Output display 304 displays status, inoperative functions, suggested updates, or other information associated with IHS 301. In one embodiment, the predetermined level of security is based on the hardware/software status displayed on output display 304. Accordingly, service processor 156 generates security credentials based on the status of IHS 100, as displayed on output display 304. For example, the information of output display 304 reads "BIOS update required". Service processor 156 detects a connection of service device 141 to SP USB port 127 and identification input. Responsively, service processor 156 generates security credentials that correspond to managing the BIOS update.

In one embodiment, IHS 301 authenticates identification input received at hardware input 302. In response to authenticating identification input, service processor 156 engenders digitally generated keyboard 128 as a functional component of IHS 301. USB cable connects to IHS 301 at micro USB port 306 or USB port 308. Service processor 156 forms a secure communication link via USB cable 340 by providing a unidirectional write path to service device 341. In one embodiment, service processor establishes a secure digital handshake between service processor 156 and service device 341 as a prerequisite to communicatively connecting digitally generated keyboard 328 to service device 341. Digitally generated keyboard 328 emulates a hardwired keyboard connected to service processor 156 via USB cable 340. Service processor 156 outputs digitally generated keyboard 328 to a display of service device 341.

According to one aspect, digitally generated keyboard 128 is solely accessible for input by service processor 156. In one embodiment, service processor 156 generates security credentials associated with accessing certain functionalities of IHS 301, and service processor 156 generates temporary security credentials to digitally generated keyboard 328. Service processor 156 detects an open text editor at service device 341. Open text editor can be text editor 350 of FIG. 3B, for example. Service processor 156 establishes communication between digitally generated keyboard 128 and open text editor 350 on service device 341, and service processor 156 enables digitally generated keyboard 128 to write the security credentials to open text editor 350. In response to digitally generated keyboard 128 completing the write of the security credentials to the open text editor, service processor 156 disconnects digitally generated keyboard 128 from service device 341.

In one embodiment, a user or operator of service device 341 utilizes the security credentials to access certain functionalities of IHS 301. Service processor 156 enables selection of the security credentials from the open text editor 350 to input to a software interface that is associated with service processor 156. The software interface is, for example, a select network interface that is specific to service processor 156. In one embodiment, service processor 156 can utilize an interface that is not shared with the host operating system and routes the management of certain operations to a separate physical network. The rerouting of the operations to a separate physical network can be beneficial to the institution being serviced, as the management of the certain operations do not impede daily functionalities of the existing, daily utilized network. This rerouting is specifically beneficial when IHS 301 is active as a host machine to multiple virtual machines and/or hypervisors. Based on the provided security credentials, the select network interface that is specific to service processor 156 can enable commands that allow the service operator to perform certain functionalities that include, without limitation: view managed system information; perform power operations on the managed system; perform firmware updates; and/or configure settings. Responsively, service processor 156 invokes the system changes that correspond to the changes presented by service device 341.

Figure 4A:
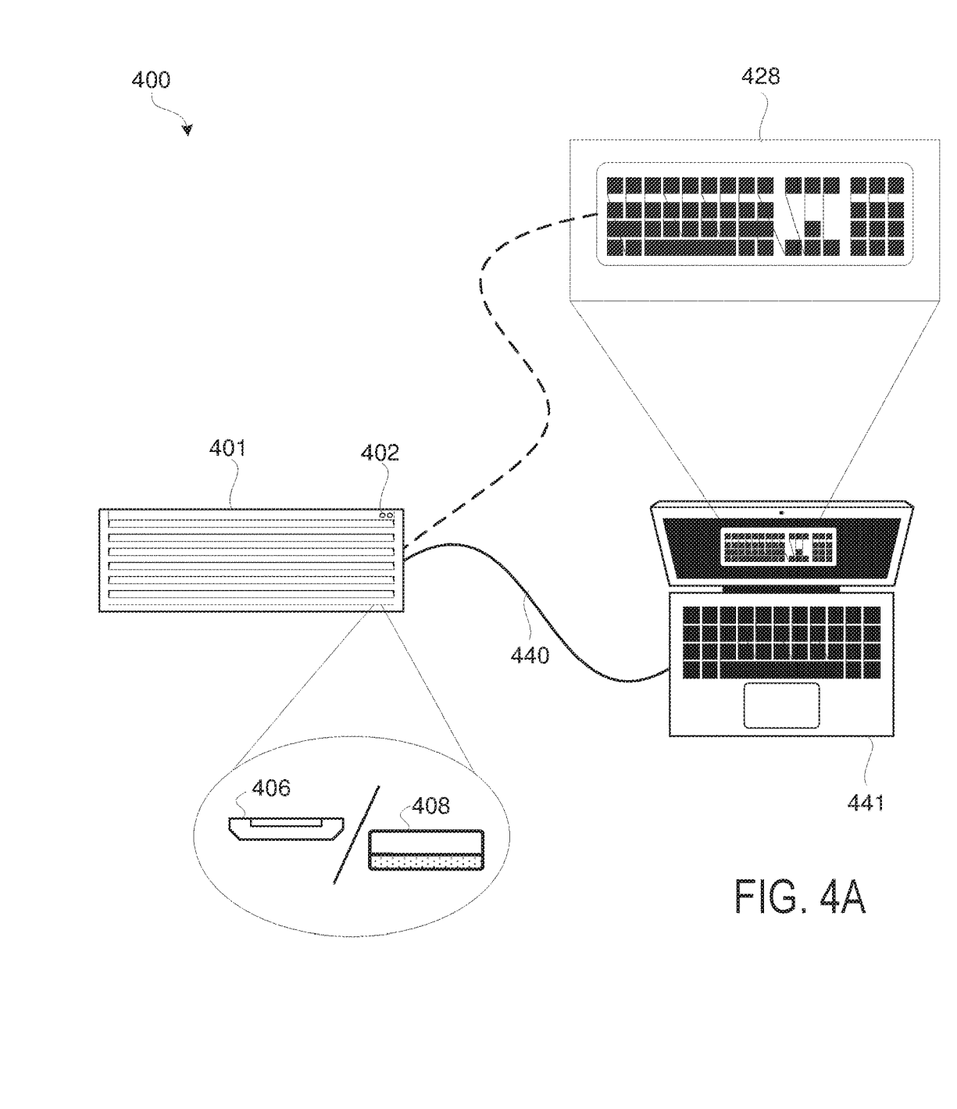
FIG. 4A illustrates an example information handling system without having an information screen communicatively coupled to a second device, according to one or more embodiments.
Figure 4B:
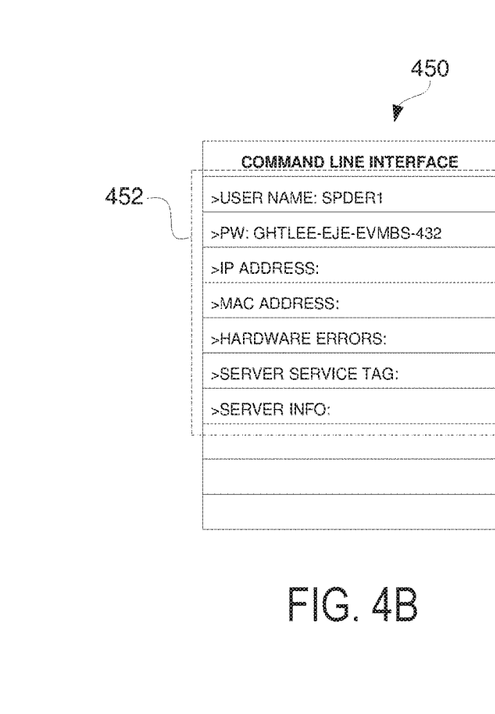
FIG. 4B illustrates an example text editor, according to one or more embodiments.

FIG. 4A illustrates an example IHS service environment 400 having IHS (401) that does not include an information screen. IHS 401 is communicatively coupled to a second device (441), according to one or more embodiments. IHS service environment 400 includes IHS 401, service device 441, and digitally generated keyboard 428. IHS 401 includes hardware input 402 and input/output device interfaces, micro USB port 406 and USB port 408. IHS 401 is similar in components and functionality to IHS 100 and connects to service device 441 via USB cable 440. FIG. 4B illustrates an example writeable text editor 450, according to one or more embodiments.

In IHS service environment 400, the operations and components of IHS 401 and service device 441 are substantially similar to the functionalities of IHS 301 and service device 341 within IHS service environment 300. In one embodiment IHS 401 does not have an output display for providing the current status of hardware, IP address, MAC address, etc. In response to not detecting a writeable text editor at service device 441, service processor 156 generates a prompt to service device 441 to open writeable text editor 450. Service processor 156 outputs the prompt to service device 441. Service processor 156 retrieves, from a command-line interface, information 452 associated with IHS 401, and selectively outputs information 452 to writeable text editor 450. Enabling service processor 156 to write information to writeable text editor 450 is an added advantage. Using writeable text editor 450, IHS devices that do not include output displays can provide useable information about IHS 401, and functions thereof, to a service provider during service operations. The information provided can also be beneficial in notifying the service operator of the level of security access granted. In this way, the service operator can prepare the proper updates and changes to settings for the IHS device.

Figure 5:
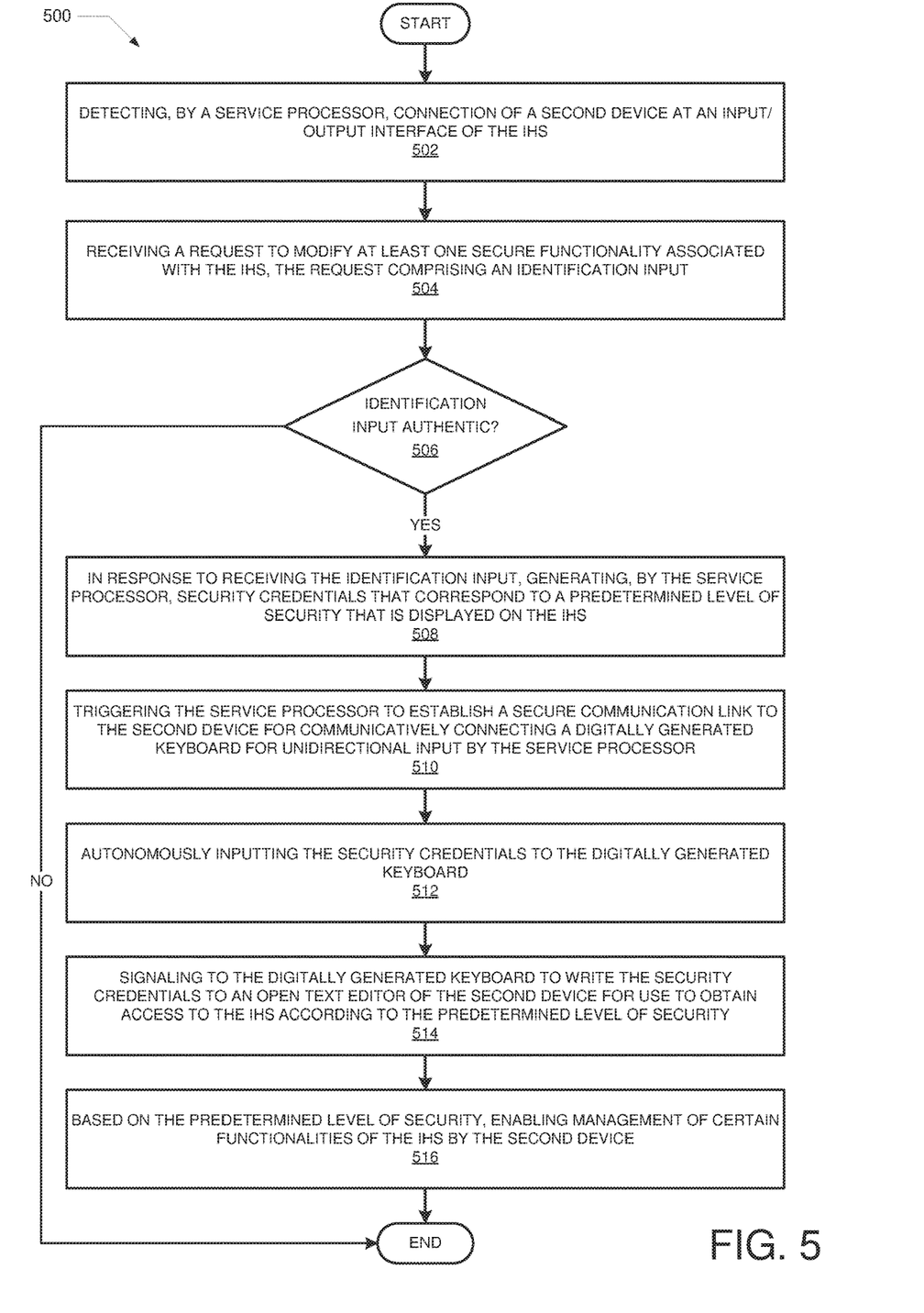
FIG. 5 illustrates a flow chart of a method for generating a digital keyboard and provisioning security credentials to the digital keyboard, according to one or more embodiments.
Figure 6:
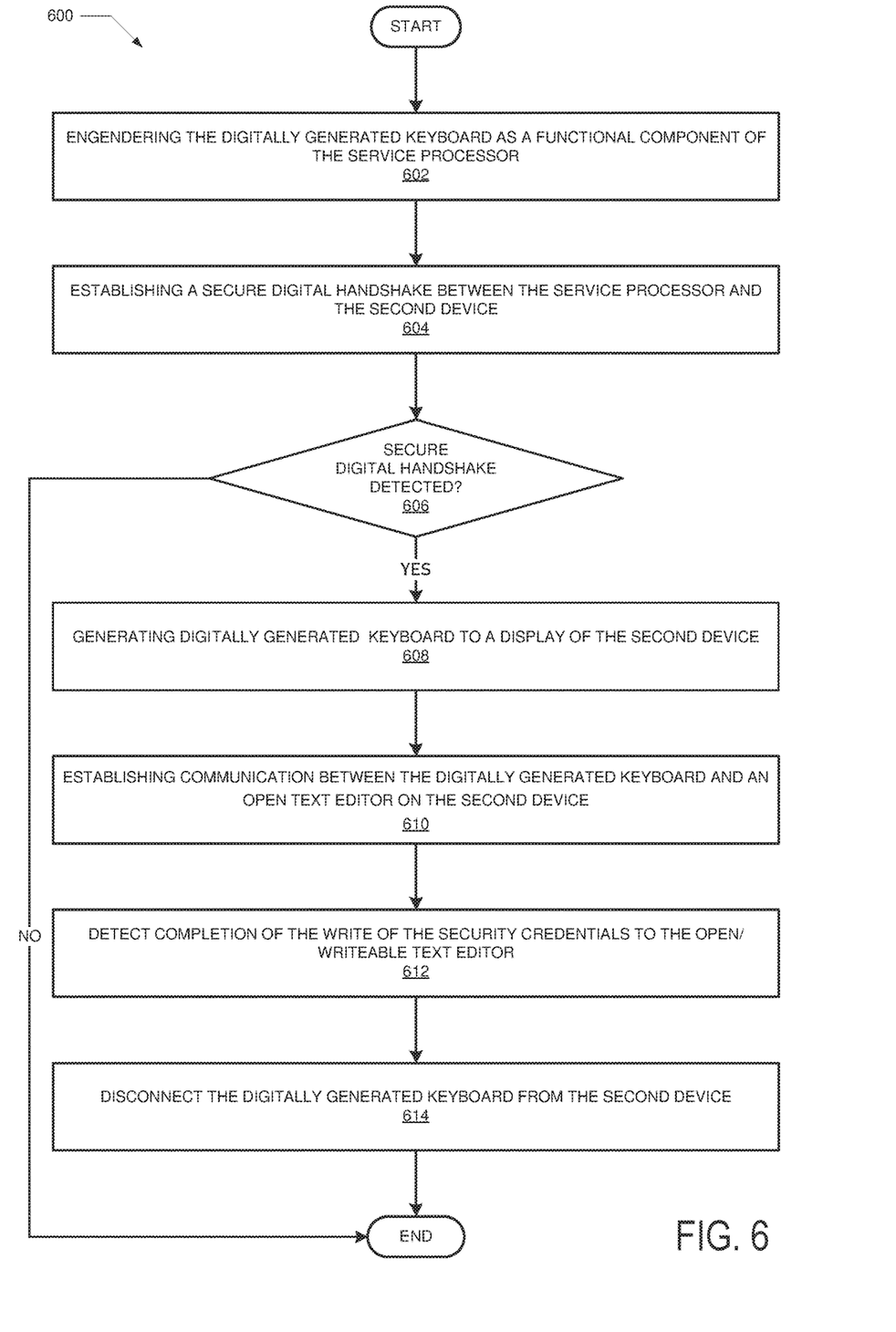
FIG. 6 illustrates a flow chart of a method for providing the digital keyboard to a second device, according to one or more embodiments.
Figure 7:
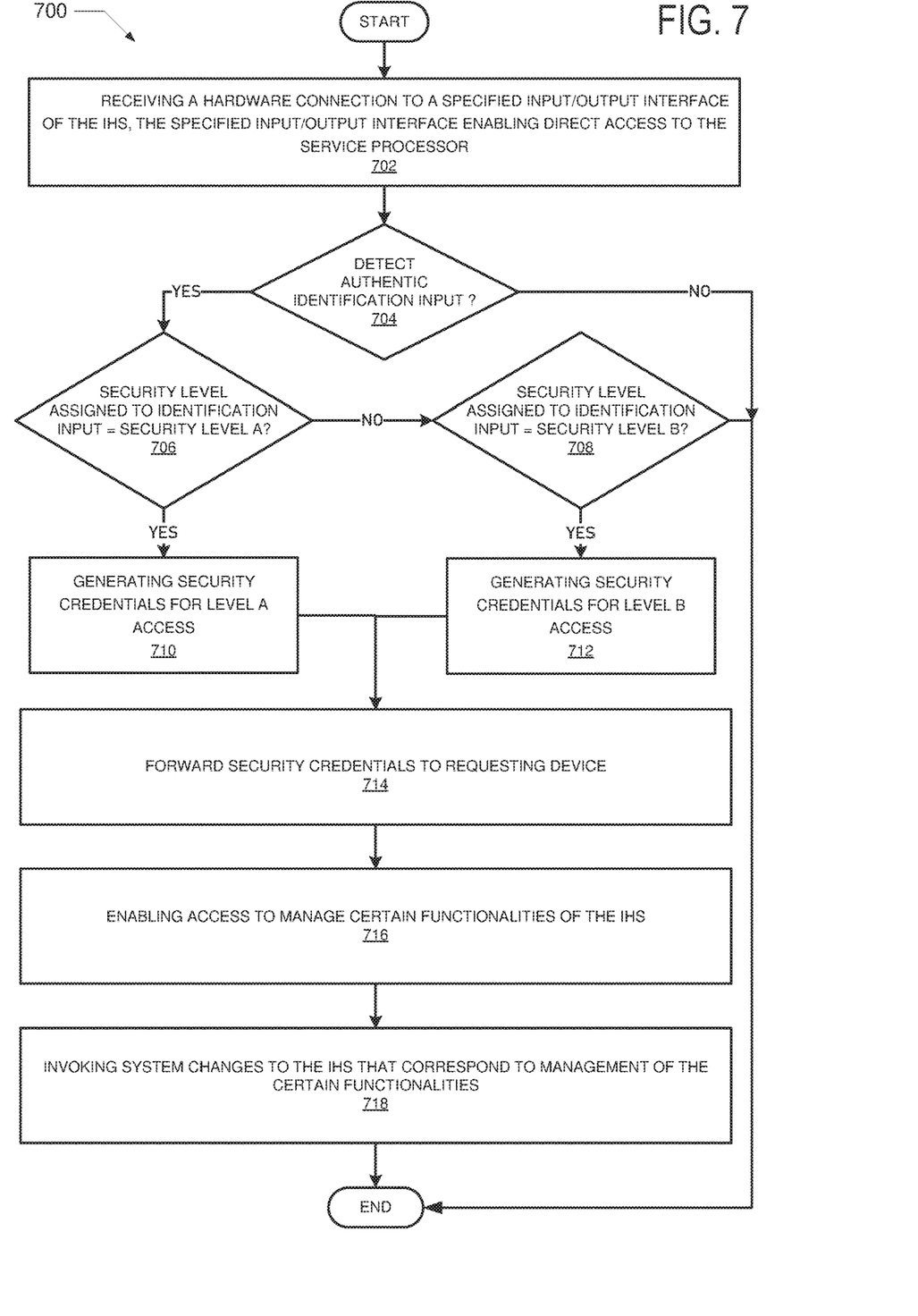
FIG. 7 illustrates a flow chart of a method for generating security credentials to access the IHS, according to one or more embodiments.

FIGS. 5, 6, and 7 illustrate flowcharts of an exemplary method 500, 600, and 700 by which service processor 156 (FIG. 1) performs different aspects of the processes that enable the one or more embodiments of the disclosure. Generally, methods 500, 600, and 700 represent computer-implemented methods. The description of methods 500, 600 and 700 are provided with general reference to the specific components illustrated within FIGS. 1-4.

FIG. 5 illustrates a flow chart of a method 500 for generating a digital keyboard and provisioning security credentials to the digital keyboard, according to one or more embodiments. Method 500 is performed when SDK utility 160 is executed by service processor 156. Method 500 begins at the start block and includes detecting, by a service processor, connection of a second device at an input/output interface of the IHS 100 (block 502). Service processor 156 receives a request to modify at least one secure functionality associated with the IHS 100, the request including an identification input (block 504). A determination is made whether the identification input is authentic, i.e., is associated with a user/device that is permitted to modify or update certain functions of IHS (decision block 506). In response to the identification input being authentic, service processor 156 generates security credentials that correspond to a predetermined level of security that is displayed on IHS 301 (block 508). SDK utility 160 triggers service processor 156 to establish a secure communication link to the second device (service device 141). The secure communication link is used to communicatively connect digitally generated keyboard 128 for unidirectional input by the service processor 156 (block 510). Service processor 156 autonomously inputs the security credentials to digitally generated keyboard 128 (block 512). Service processor 156 triggers digitally generated keyboard 128 to write the security credentials to an open text editor of the second device (service device 141) for use to unlock access to IHS 100. Service processor 156 generates the security credentials according to the predetermined level of security (block 514). Based on the predetermined level of security, service processor 156 enables management by the second device (service device 141) of certain functionalities of IHS 100 (block 516). The process concludes at the end block.

FIG. 6 illustrates a flow chart of a method 600 for providing the digital keyboard to a second device, according to one or more embodiments. Method 600 is performed by execution of SDK utility 160 by service processor 156. Service processor 156 engenders the digitally generated keyboard as a functional component of service processor 156 (block 602). Utilizing the secure communication link, service processor 156 establishes a secure digital handshake with the second device (141) as a prerequisite to communicatively connect the digitally generated keyboard to the second device (block 604). Service processor 156 determines whether a secure digital handshake is detected (decision block 606). In response to service processor 156 detecting a secure digital handshake, service processor 156 outputs a digitally generated keyboard to a display of the second device (608). In response to service processor 156 not detecting a secure digital handshake, the method ends. Service processor 156 establishes communication between the digitally generated keyboard and an open text editor (350) on the second device (141) (block 610). Service processor 156 detects completion of the write of the security credentials to the open/writeable text editor (350) (block 612). Service processor 156 disconnects the digitally generated keyboard from the second device (141) (block 614). The method concludes at the end block.

FIG. 7 illustrates a flow chart of a method 700 for generating security credentials to access the IHS, according to one or more embodiments. Method 700 is performed by SDK utility 160 executing on service processor 156, and in part by credential generator 162 being executed by service processor 156. Method 700 begins at the start block and includes receiving a signal indicating a hardware connection to a specified input/output interface (127) of IHS 100. The specified input/output interface (127) enables direct access to service processor 156 (702). A determination is made whether service processor 156 detects an authentic identification input (decision block 704). In response to not detecting authentic input, the method concludes at the end block. In response to detecting authentic identification input, service processor 156 determines the predetermined level of security assigned to the identification input. A determination is made whether the predetermined level of security is a "security level A" (decision block 706). In response to the predetermined level of security being security level A, service processor 156 generates security credentials for level A access (block 710). In response to the predetermined level not being security being "security level A", a determination is made whether the security level assigned to the identification input is a "security level B" (decision block 708). In response to the predetermined level of security not being security level B, the process ends. In response to the predetermined level of security being security level B, service processor 156 generates security credentials for level B access (block 712). Service processor 156 forwards the security credentials to the requesting device (block 714). Service processor 156 enables access to manage certain functionalities of IHS 100 (block 716) based on the level of security access. Service processor 156 invokes system changes to IHS 100 that correspond to management of the certain functionalities (block 718). The method concludes at the end block.

In the above described flow charts of FIGS. 5, 6 and 7, one or more of the methods may be embodied in a controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out the disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in the specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for managing security credentials associated with a service processor of an information handling system (IHS), the method comprising:
   detecting, by a service processor, connection of a second device at an input/output interface of the IHS;
   receiving a request to modify at least one secure functionality associated with the IHS, the request comprising an identification input;
   in response to receiving the identification input, generating, by the service processor, security credentials that correspond to a predetermined level of security that is assigned to the identification input;
   triggering the service processor to establish a secure communication link to the second device for communicatively connecting a digitally generated keyboard for unidirectional input by the service processor;
   autonomously inputting the security credentials to the digitally generated keyboard;
   signaling to the digitally generated keyboard to write the security credentials to an open text editor of the second device for use to unlock access to the IHS according to the predetermined level of security; and
   based on the predetermined level of security, enabling management of certain functionalities of the IHS by the second device.

2. The method of claim 1, further comprising:
   authenticating the identification input;

engendering the digitally generated keyboard as a functional component of the service processor;
utilizing the secure communication link, establishing a secure digital handshake with the second device as a prerequisite to communicatively connect the digitally generated keyboard to the second device; and
outputting the digitally generated keyboard to a display of the second device.

3. The method of claim 1, further comprising:
establishing communication between the digitally generated keyboard and the open text editor on the second device;
detecting a write of the security credentials to the open text editor; and
in response to detecting the write of the security credentials to the open text editor, disconnecting the digitally generated keyboard from the second device.

4. The method of claim 1, further comprising:
detecting a hardware connection to a specified input/output interface of the IHS, the specified input/output interface enabling direct access to the service processor;
concurrently receiving the identification input as a hardware trigger; and
in response to receiving the hardware trigger, determining, by the service processor, the predetermined level of security that corresponds to the hardware trigger.

5. The method of claim 1, further comprising:
enabling selection of the security credentials from the open text editor to input to a software interface that is associated with the service processor for unlocking access to manage the certain functionalities of the IHS; and
invoking system changes to the IHS that correspond to management of the certain functionalities.

6. The method of claim 1, further comprising:
establishing, by the service processor, a secure connection to the second device for managing the certain functionalities of the IHS using a select network interface that is specific to the service processor.

7. The method of claim 1, further comprising:
in response to not detecting a writeable text editor, generating a prompt to open the writeable text editor on the second device;
outputting the prompt to the second device; and
in response to detecting opening of the writeable text editor, writing the security credentials to the writeable text editor.

8. The method of claim 7, further comprising:
retrieving, from a command-line interface, information associated with the IHS; and
selectively outputting the information to the writeable text editor.

9. The method of claim 1, wherein the input/output interface of the IHS is a micro universal serial bus port utilized for obtaining direct access to the service processor that is associated with the IHS.

10. The method of claim 1, wherein the digitally generated keyboard is solely accessible for input by the service processor.

11. An information handling system (IHS), comprising:
a processor;
a service processor communicatively coupled to the processor; and
a memory system communicatively coupled to the service processor and having stored thereon a secure digital keyboard utility that executes on the service processor to enable the service processor to:
detect connection of a second device at an input/output interface of the IHS;
receive a request to modify at least one secure functionality associated with the IHS, the request comprising an identification input;
in response to receiving the identification input, generate security credentials that correspond to a predetermined level of security that is assigned to the identification input;
trigger the service processor to establish a secure unidirectional communication link to the second device for communicatively connecting a digitally generated keyboard for unidirectional input by the service processor;
autonomously input the security credentials to the digitally generated keyboard;
signal to the digitally generated keyboard to write the security credentials to an open text editor of the second device for use to unlock access to the IHS according to the predetermined level of security; and
based on the predetermined level of security, enable management of certain functionalities of the IHS by the second device.

12. The IHS of claim 11, wherein the secure digital keyboard utility further enables the service processor to:
authenticate the identification input;
engender the digitally generated keyboard as a functional component of the service processor;
utilize the secure communication link to establish a secure digital handshake with the second device as a prerequisite to communicatively connecting the digitally generated keyboard to the second device; and
output the digitally generated keyboard to a display of the second device.

13. The IHS of claim 11, wherein the secure digital keyboard utility further enables the service processor to:
establish communication between the digitally generated keyboard and the open text editor on the second device;
detect a write of the security credentials to the open text editor; and
in response to detecting the write of the security credentials to the open text editor, disconnect the digitally generated keyboard from the second device.

14. The IHS of claim 11, wherein the secure digital keyboard utility further enables the service processor to:
detect a hardware connection to a specified input/output interface of the IHS, the specified input/output interface enabling direct access to the service processor;
concurrently receive the identification input as a hardware trigger; and
in response to receiving the hardware trigger, determine, by the service processor, the predetermined level of security that corresponds to the hardware trigger.

15. The IHS of claim 11, wherein the secure digital keyboard utility further enables the service processor to:
enable selection of the security credentials from the open text editor to input to a software interface that is associated with the service processor for obtaining access to manage the certain functionalities of the IHS; and
invoke system changes to the IHS that correspond to management of the certain functionalities.

16. The IHS of claim 11, wherein the secure digital keyboard utility further enables the service processor to:
establish, by the service processor, a secure connection to the second device for managing the certain functionalities of the IHS using a select network interface that is specific to the service processor.

17. The IHS of claim 11, wherein the secure digital keyboard utility further enables the service processor to:
in response to not detecting a writeable text editor, generate a prompt to open the writeable text editor on the second device;
output the prompt to the second device; and
in response to detecting opening of the writeable text editor, write the security credentials to the writeable text editor.

18. The IHS of claim 17, wherein the secure digital keyboard utility further enables the service processor to:
retrieve, from a command-line interface, information associated with the IHS; and
selectively output the information to the writeable text editor.

19. The IHS of claim 11, wherein the input/output interface of the IHS is a micro universal serial bus port utilized for obtaining direct access to the service processor that is associated with the IHS.

20. The IHS of claim 11, wherein the digitally generated keyboard is solely accessible for input by the service processor.

* * * * *